(12) United States Patent
Hung et al.

(10) Patent No.: US 11,828,850 B2
(45) Date of Patent: Nov. 28, 2023

(54) 3D IMAGE SENSOR AND RELATED 3D IMAGE SENSING MODULE AND HAND-HELD DEVICE

(71) Applicant: SHENZHEN GOODIX TECHNOLOGY CO., LTD., Guangdong (CN)

(72) Inventors: Tzu-Li Hung, Guangdong (CN); Yu-An Liang, Guangdong (CN); Meng-Ta Yang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 580 days.

(21) Appl. No.: 17/027,586

(22) Filed: Sep. 21, 2020

(65) Prior Publication Data
US 2021/0080588 A1 Mar. 18, 2021

Related U.S. Application Data

(63) Continuation of application No. PCT/CN2019/098103, filed on Jul. 29, 2019.

(51) Int. Cl.
*G01S 17/894* (2020.01)
*H04N 13/254* (2018.01)
(Continued)

(52) U.S. Cl.
CPC ............ *G01S 17/894* (2020.01); *G01B 11/22* (2013.01); *G01S 7/4814* (2013.01); *G01S 7/4816* (2013.01);
(Continued)

(58) Field of Classification Search
CPC ...... G01S 17/894; H04N 13/254; G01B 11/22
(Continued)

(56) References Cited

U.S. PATENT DOCUMENTS 7,924,207 B2  4/2011  Snoeij et al.
2014/0104397 A1  4/2014  Shin et al.
(Continued)

FOREIGN PATENT DOCUMENTS

CN  103731611 A  4/2014
CN  104067607 A  9/2014
(Continued)

OTHER PUBLICATIONS

English Abstract Translation of Foreign Reference CN103731611A.
(Continued)

*Primary Examiner* — Jeffery A Williams
(74) *Attorney, Agent, or Firm* — WPAT, P.C.; INTELLECTUAL PROPERTY ATTORNEYS; Anthony King

(57) ABSTRACT

The present disclosure discloses a three-dimensional (3D) image sensor and a related 3D image sensing module and hand-held device. The 3D image sensor includes, a photosensitive pixel array, including: a first photosensitive pixel; a second photosensitive pixel; and a pixel control signal transmission line, so that the first photosensitive pixel and the second photosensitive pixel respectively output a first photosensitive value and a second photosensitive value according to a pixel control signal; wherein the pixel control signal reaches a first node at a first time point and reaches a second node at a second time point; a delay detection module, including: a first delay detection circuit, for determining a time difference between the first time point and the second time point; and a processing unit, for generating the first depth information and the second depth information based on the first photosensitive value, the second photosensitive value, and the time difference.

20 Claims, 11 Drawing Sheets

(51) Int. Cl.
  *G01B 11/22* (2006.01)
  *H04N 13/296* (2018.01)
  *G01S 7/481* (2006.01)
  *H04N 25/70* (2023.01)
  *H04N 13/00* (2018.01)

(52) U.S. Cl.
  CPC ......... *H04N 13/254* (2018.05); *H04N 13/296* (2018.05); *H04N 25/70* (2023.01); *H04N 2013/0081* (2013.01)

(58) Field of Classification Search
  USPC .......................................................... 348/46
  See application file for complete search history.

(56) References Cited

U.S. PATENT DOCUMENTS

| | | | |
|---|---|---|---|
| 2014/0184746 A1 | 7/2014 | Kang et al. | |
| 2015/0130904 A1 | 5/2015 | Bae et al. | |
| 2017/0064235 A1* | 3/2017 | Wang | .................. H04N 13/133 |
| 2019/0058812 A1 | 2/2019 | Liang et al. | |

FOREIGN PATENT DOCUMENTS

| | | |
|---|---|---|
| CN | 109005326 A | 12/2018 |
| EP | 1324072 A2 | 7/2003 |
| EP | 3508874 A1 | 7/2019 |
| WO | 02057714 A1 | 7/2002 |

OTHER PUBLICATIONS

English Abstract Translation of Foreign Reference CN104067607A.
International Searching Authority (ISA) Form 210—International Search Report of PCT/CN2019/098103.
International Searching Authority (ISA) Form 220—Notification of Transmittal of the International Search Report of PCT/CN2019/098103.
International Searching Authority (ISA) Form 237—Written Opinion of PCT/CN2019/098103.
As-filed PCT Request of PCT/CN2019/098103.
As-filed PCT Application of PCT/CN2019/098103.
Notification of Receipt of Search Copy in Chinese (Form PCT/ISA/202) of PCT/CN2019/098103.
English Abstract of CN103731611A.
English Abstract of CN104067607A.
English Abstract of CN109005326A.

* cited by examiner under the page image.

3D IMAGE SENSOR AND RELATED 3D IMAGE SENSING MODULE AND HAND-HELD DEVICE

CROSS REFERENCE TO RELATED APPLICATIONS

The present disclosure is a continuation of international application No. PCT/CN2019/098103, filed on Jul. 29, 2019, which is hereby incorporated by reference in its entirety.

TECHNICAL FIELD

The present disclosure relates to an image sensor; in particular, to a three-dimensional (3D) image sensor and a 3D image sensing module and a hand-held device of the same.

BACKGROUND

CMOS image sensors have been mass-produced and widely applied. Conventional image sensors may generate two-dimensional (2D) images and videos; recently, image sensors and systems capable of generating three-dimensional (3D) images attract widespread attention, these 3D image sensors can be used in applications such as facial recognition, augmented reality (AR), virtual reality (VR), drones, among others.

There are three main implementations of existing 3D image sensors: stereoscopic binocular, structured light, and time-of-flight (ToF).

The ToF approach uses specially designed pixels to determine the distance by measuring the time it takes for photons to fly and return. In order to increase the accuracy of modeling and to reduce the cost, how to improve the accuracy of ToF sensors in a simple way has become an important task.

SUMMARY OF THE INVENTION

One purpose of the present disclosure is to disclose an image sensor, in particular, a 3D image sensor and a 3D image sensing module and a hand-held device of the same, to address the above-mentioned issues.

One embodiment of the present disclosure discloses a 3D image sensor, configured to generate a first depth information and a second depth information for a first location and a second location of a target object, respectively, by using a light-emitting module to emit light to the target object, wherein the 3D image sensor includes, a photosensitive pixel array, including: a first photosensitive pixel; a second photosensitive pixel; and a pixel control signal transmission line, having a first node and a second node respectively coupled to the first photosensitive pixel and the second photosensitive pixel to transmit the pixel control signal to the first photosensitive pixel and the second photosensitive pixel, so that the first photosensitive pixel and the second photosensitive pixel respectively outputs a first photosensitive value and a second photosensitive value corresponding to the first location and the second location according to the pixel control signal; wherein time taken for the pixel control signal to reach the first photosensitive pixel from the first node is the same as time taken for the pixel control signal to reach the second photosensitive pixel from the second node, and the pixel control signal reaches the first node at a first time point and reaches the second node at a second time point, wherein the second time point is later than the first time point; a delay detection module, wherein the delay detection module includes a first delay detection circuit having a first input terminal and a second input terminal respectively coupled to the first node and the second node, wherein the delay detection module is configured to determine a time difference between the first time point and the second time point; and a processing unit, configured to generate the first depth information and the second depth information based on the first photosensitive value, the second photosensitive value, and the time difference.

One embodiment of the present disclosure discloses a 3D image sensing module, including the above-mentioned 3D image sensor and the light-emitting module.

One embodiment of the present disclosure discloses a hand-held device, including a display panel and the above-mentioned 3D image sensing module.

The 3D image sensor disclosed by the present disclosure includes a delay detection module. Since the delay detection module can determine the time difference between the pixel control signals reaching different nodes, relatively accurate depth information for the target object can be generated based on the time difference.

DETAILED DESCRIPTION

Figure 1:
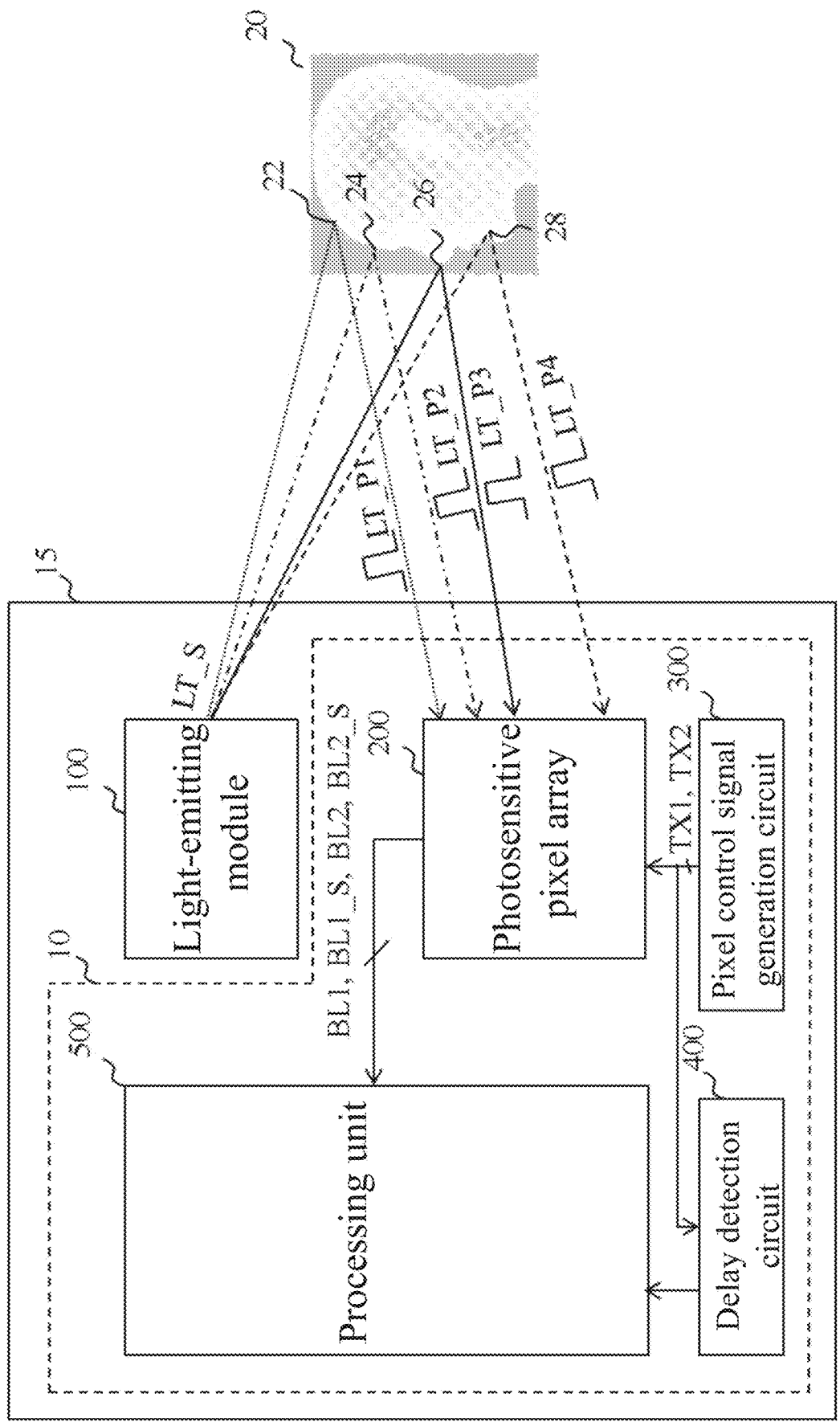
FIG. 1 is a schematic diagram illustrating a 3D image sensing module performing ToF sensing on a target object to generate a 3D image according to one embodiment of the present disclosure.

The following disclosure provides many different embodiments, or examples, for implementing different features of the invention. Specific examples of components and arrangements are described below to simplify the present disclosure. As could be appreciated, these are, of course, merely examples and are not intended to be limiting. For example, the formation of a first feature over or on a second feature in the description that follows may include embodiments in which the first and the second features are formed in direct contact, and may also include embodiments in which additional features may be formed between the first and the second features, such that the first and the second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," and the like, may be used herein for the ease of the description to describe one element or feature's relationship with respect to another element(s) or feature(s) as illustrated in the drawings. The spatially relative terms are intended to encompass different orientations of the device in use or operation in addition to the orientation depicted in the figures. The apparatus may be otherwise oriented (e.g., rotated by 90 degrees or at other orientations) and the spatially relative descriptors used herein may likewise be interpreted accordingly.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. As could be appreciated, other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed considering the number of reported significant digits and by applying ordinary rounding techniques. Ranges can be expressed herein as from one endpoint to another endpoint or between two endpoints. All ranges disclosed herein are inclusive of the endpoints unless specified otherwise.

When the image sensor is used to compute the ToF, a plurality of photosensitive pixels are under the control of the control signals in the control lines, yet the routing distance for the control signal to each photosensitive pixel is different, thereby causing a delay error. The 3D image sensor disclosed by the present disclosure can compensate for the above-mentioned delay error, thereby improving the accuracy of the ToF sensor, see below for details.

FIG. 1 is a schematic diagram illustrating a 3D image sensing module 15 performing ToF sensing on a target object 20 to generate a 3D image according to one embodiment of the present disclosure. The 3D image sensing module 15 includes a 3D image sensor 10 and a light-emitting module 100. Referring to FIG. 1, the 3D image sensor 10 is configured to generate depth information corresponding to a plurality of locations on the target object 20. For convenience, in the 3D image sensor 10 of FIG. 1, the first depth information, the second depth information, the third depth information, and the fourth depth information are respectively generated for the first location 22, the second location 24, the third location 26, and the fourth location 28 of the target object 20 for illustrative purposes; however, the present disclosure is not limited to said four locations.

The light-emitting module 100 is configured to emit light (incident light) LT_S to the target object 20. The target object 20 reflects light to the photosensitive pixel array 200. In some embodiments, the light-emitting module 100 includes a laser diode (LD), a light-emitting diode (LED) or other light-emitting units capable of generating lights.

The 3D image sensor 10 includes the photosensitive pixel array 200, a pixel control signal generation circuit 300, a delay detection module 400, and a processing unit 500. The photosensitive pixel array 200 is configured to receive the reflected light LT_P1, LT_P2, LT_P3, and LT_P4 respectively from the first location 22, the second location 24, the third location 26, and the fourth location 28. The photosensitive pixel array 200 includes a plurality of photosensitive pixels (not shown in FIG. 1). Each photosensitive pixel includes a photosensitive region and a pixel circuit, which will be discussed in detail in connection with FIG. 2. The photosensitive region receives the irradiation from the reflected light LT_P1, LT_P2, LT_P3, and LT_P4 thereby forming the photocharge or photocurrent. Next, the photosensitive region stores the electric charges corresponding to the photocharge or photocurrent. The pixel circuit converts the electric charges stored in the photosensitive region into an electric signal and outputs the electric signal to the processing unit 500, which will be discussed in detail in connection with FIG. 3 to FIG. 4. In some embodiments, each photosensitive pixel may include a photodiode.

The pixel control signal generation circuit 300 is coupled to the photosensitive pixel array 200, and is configured to generate pixel control signals TX1 and TX2 to activate a plurality of photosensitive pixels of the photosensitive pixel array 200. Specifically, the pixel control signal generation circuit 300 controls whether to read the electric signal obtained by the plurality of photosensitive pixels of the photosensitive pixel array 200 by changing the electric potential of the pixel control signals TX1 and TX2. The time at which the electric potential of the pixel control signals TX1 and TX2 changes is controlled by the pixel control signal generation circuit 300, and hence, the time at which the electric potential of the pixel control signals TX1 and TX2 changes is known, or can be considered as a predetermined value. In some embodiments, the pixel control signal generation circuit 300 includes a clock signal generation circuit.

The delay detection module 400 is configured to determine a time difference between the activation time of each photosensitive pixel, i.e., the time difference between the time at which the pixel control signals TX1 and TX2 reaches each photosensitive pixel; that is, the delay difference between the pixel control signals TX1 and TX2 reaching each photosensitive pixel through the transmission line. Since the time difference may contribute to the error when estimating the ToF, the delay detection module 400 outputs the time difference to the processing unit 500, so that the processing unit 500 compensates the ToF obtained by each photosensitive pixel to eliminate the error, which will be discussed in detail in connection with FIG. 3 to FIG. 4. In some embodiments, the delay detection module 400 includes a time-to-digit converter.

The processing unit 500 is configured to generate first depth information, the second depth information, the third depth information, and the fourth depth information of the target object 20 based on the electric signal and the time difference. For example, the processing unit 500 may use the four electric signals obtained by the four photosensitive pixels of the photosensitive pixel array 200 to calculate the first depth information and non-compensated second depth information, third depth information and fourth depth information, and then use the time difference corresponding to the first depth information and second depth information, the time difference corresponding to the second depth information and third depth information, and the time difference corresponding to the third depth information and the fourth depth information to compensate the above-mentioned non-compensated second depth information, third depth information, and fourth depth information, thereby obtaining the first depth information, the second depth information, the third depth information, and the fourth depth information of the target object 20. In other words, the above-mentioned compensation cancels the relative error between each depth information resulted from the time difference between the time at which the pixel control signals TX1 and TX2 reaches each photosensitive pixel. The present disclosure does not particularly limit the operation of the processing unit 500; in some embodiments, the processing unit 500 may include a control unit (CU), an arithmetic logic unit (ALU) and a storage unit. The storage unit may store codes, wherein the codes are configured to indicate the operation process of the control unit and the arithmetic logic unit. In some embodiments, the processing unit 500 may be implemented using an application specific integrated circuit (ASIC), a digital signal processor (DSP), a general-purpose processor, or an application processor.

In the present disclosure, since the 3D image sensor 10 includes the delay detection module 400 capable of determining the time difference between the activation time of each photosensitive pixel, the processing unit 500 can generate a relatively accurate depth information based on the time difference. On the other hand, when the 3D image sensor does not include modules similar to the delay detection module 400, the depth information generated by the 3D image sensor is relatively inaccurate due to the lack of the information of the actual time difference between the activation time of each photosensitive pixel.

Figure 2:
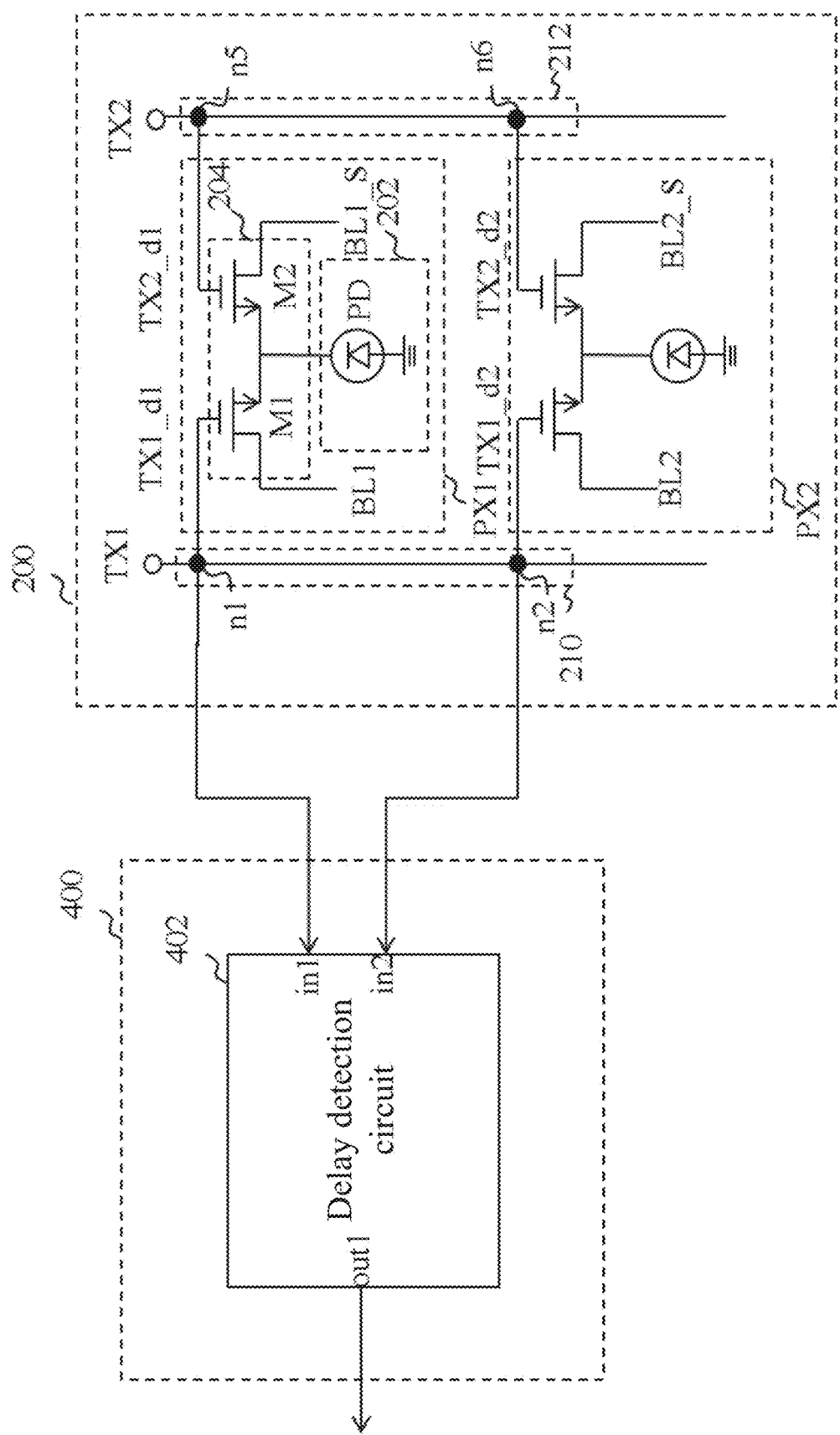
FIG. 2 is a circuit diagram of the circuits of the photosensitive pixel array and the delay detection module shown in FIG. 1.

FIG. 2 is a circuit diagram of the circuits of the photosensitive pixel array 200 and the delay detection module 400 shown in FIG. 1. Referring to FIG. 2, in which only a single line of the photosensitive pixel and two photosensitive pixels (i.e., the first photosensitive pixel PX1 and the second photosensitive pixel PX2) in the single line photosensitive pixel are shown for the sake of brevity. Other than the first photosensitive pixel PX1 and the second photosensitive pixel PX2, the photosensitive pixel array 200 further includes pixel control signal transmission lines 210 and 212 respectively configured to transmit pixel control signals TX1 and TX2. Further, the delay detection module 400 includes a delay detection circuit 402. The delay detection circuit 402 has a first input terminal in1, a second input terminal in2, and an output terminal out1.

The pixel control signal transmission line 210 has a first node n1 and second node n2. The first node n1 is closer to the signal source that provides pixel control signal TX1 than the second node n2 does; that is, the pixel control signal TX1 starts the top of from FIG. 2 and moves downward by first passing through the first node n1 and then reaching the second node n2. The first node n1 and the second node n2 are respectively coupled to the first photosensitive pixel PX1 and the second photosensitive pixel PX2, so as to transmit the pixel control signal TX1 to the first photosensitive pixel PX1 and the second photosensitive pixel PX2 to control the first photosensitive pixel PX1 and the second photosensitive pixel PX2. In some embodiments, the pixel control signal transmission line 210 may include metal transmission line.

Figure 5:
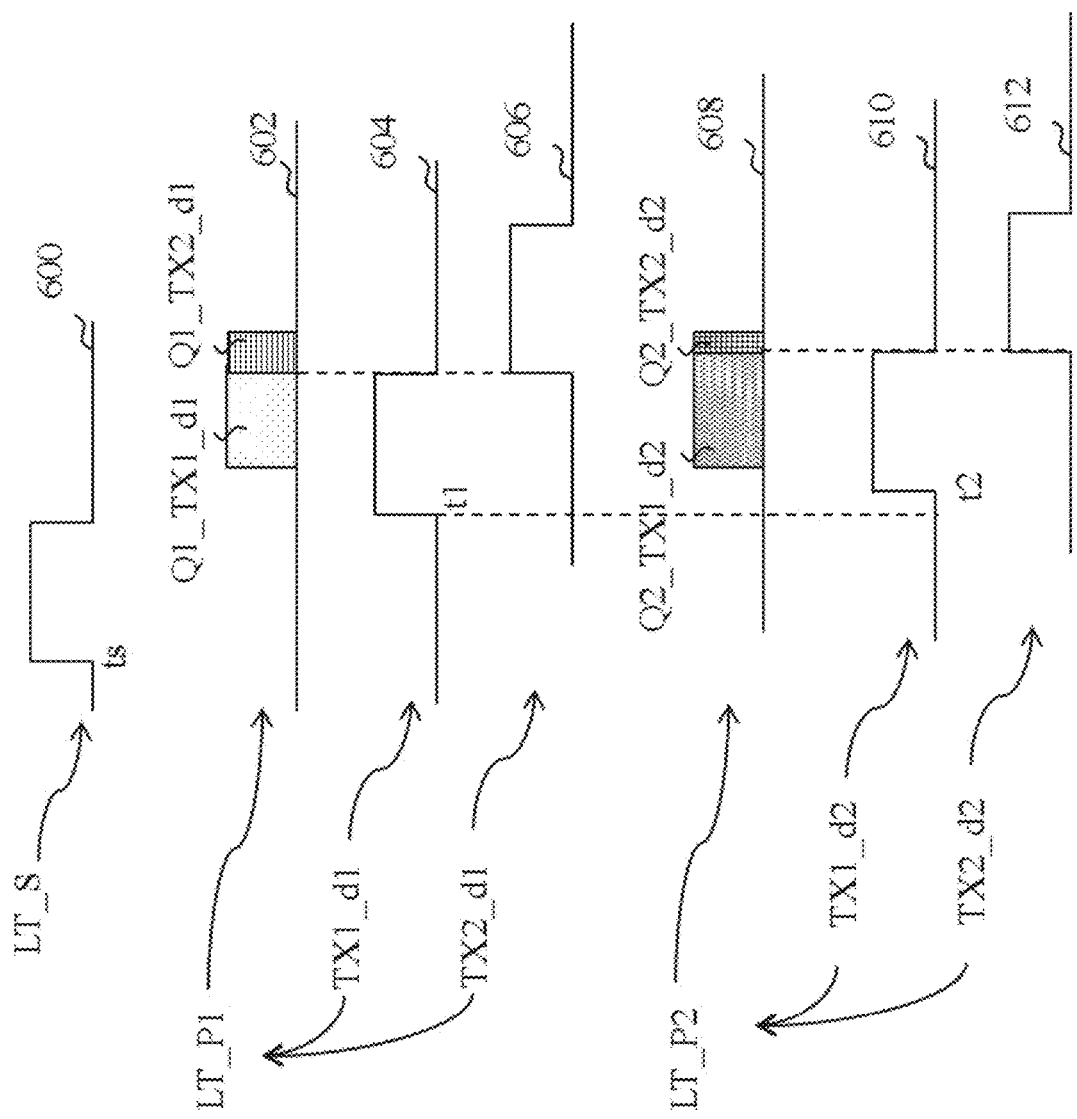
FIG. 5 is a schematic diagram showing the time sequence of signals related with the first photosensitive pixel and second photosensitive pixel shown in FIG. 3 to FIG. 4.

Because of the parasitic resistance and/or parasitic capacitance of the pixel control signal transmission line 210, the time at which the pixel control signal TX1 reaches the first node n1 is different from the time at which the pixel control signal TX1 reaches the second node n2. For example, the pixel control signal reaches the first node n1 at the first time point t1 (as shown in FIG. 5) and reaches the second node n2 at the second time point t2, wherein the second time point t2 is later than the first time point t1. The activation time of the first photosensitive pixel PX1 is thus earlier than the activation time of the second photosensitive pixel PX2, which will be discussed in detail in connection with FIG. 5.

It should be noted that, in the present disclosure, the time at which the pixel control signal TX1 from the first node n1 reaches the first photosensitive pixel PX1 is the same as the time at which the pixel control signal TX1 from the second node n2 reaches the second photosensitive pixel PX2 are the same. In short, the transmission delays of each node with respect to the corresponding photosensitive pixel are the same, and hence, no relative error between the plurality of locations would take place when the 3D image sensor 10 generates depth information corresponding to a plurality of locations on the target object 20. The above-mentioned operation environment may be implemented using an appropriate circuit layout. For example, the length of the transmission line between the first node n1 and the first photosensitive pixel PX1 and the length of the transmission line between the second node n2 and the second photosensitive pixel PX2 may be designed to be equal.

Moreover, the time at which the pixel control signal TX1 from the first node n1 reaches first input terminal in1 of the delay detection circuit 402 is the same as the same at which the pixel control signal TX1 from the second node n2 reaches second input terminal in2 of the delay detection circuit 402. In short, the transmission delays of the transmission between each node and the delay detection circuit 402 are the same, and hence, no relative error between the plurality of locations would take place when the 3D image sensor 10 generates depth information corresponding to a plurality of locations on the target object 20. The above-mentioned operation environment may be implemented using an appropriate circuit layout. For example, the length of the transmission line between the first node n1 and the first input terminal of the delay detection circuit 402 and the length of the transmission line between the second node n2 and the second input terminal of the delay detection circuit 402 may be designed to be equal.

The pixel control signal transmission line 212 has a fifth node n5 and a sixth node n6, which transmit the pixel control signal TX2 to the first photosensitive pixel PX1 and the second photosensitive pixel PX2 to control the first photosensitive pixel PX1 and the second photosensitive pixel PX2 in a similar way. Specifically, the relevant limitation to the pixel control signal TX2 is the same as the above-mentioned the pixel control signal TX1, except that to estimate the arrival time of the light being reflected to each photosensitive pixel from the target object 20, the times at which the electric potential of the signal of the pixel control signal TX2 and the pixel control signal TX1 changes (i.e., the phases)

are different. In some embodiments, the pixel control signal transmission line 212 may include a metal transmission line.

The first photosensitive pixel PX1 includes a photosensitive region 202 and a pixel circuit 204. The photosensitive region 202 includes a light sensor PD. The light sensor PD is configured to convert the incident light into the electric charges and store the same. The pixel circuit 202 includes transistors M1 and M2. The transistor M1 serves as a switch to selectively output electric charges stored by the light sensor PD to the processing unit 500 via the data line BL1 according to the pixel control signal TX. Similarly, the transistor M2 also serves as a switch to according to selectively output electric charges stored by the light sensor PD to the processing unit 500 via the data line BL1_S according to the pixel control signal TX2.

The second photosensitive pixel PX2 also includes the photosensitive region 202 and pixel circuit 204. For the purpose of simplicity, the photosensitive region 202 and pixel circuit 204 of the second photosensitive pixel PX2 are not labeled. The second photosensitive pixel PX2 outputs the stored electric charges to the processing unit 500 via the data lines BL2 and BL2_S. The operation of the second photosensitive pixel PX2 is the same as that of the first photosensitive pixel PX1, and hence is not repeated herein.

The first input terminal in1 and second input terminal in2 of the delay detection circuit 402 are respectively coupled to the first node n1 and the second node n2, and are configured to determine the time difference (t2−t1) between the first time point t1 and the second time point t2, which will be discussed in detail in connection with FIG. 3 to FIG. 5. The output terminal out1 of the delay detection circuit 402 is coupled to the processing unit 500 so as to provide the time difference (t2−t1) to the processing unit 500. The processing unit 500 generates the first depth information and the second depth information based on the photosensitive value of the first photosensitive pixel PX1, the photosensitive value of the second photosensitive pixel PX2, and the time difference (t2−t1). Specifically, after the processing unit 500 calculates the first depth information and the non-compensated second depth information, it further uses the time difference (t2−t1) to compensate the non-compensated second depth information. In some embodiments, the delay detection circuit 402 includes a time-to-digit converter, which is configured to convert the time difference (t2−t1) between the first time point t1 and the second time point t2 into a digital signal.

Figure 3:
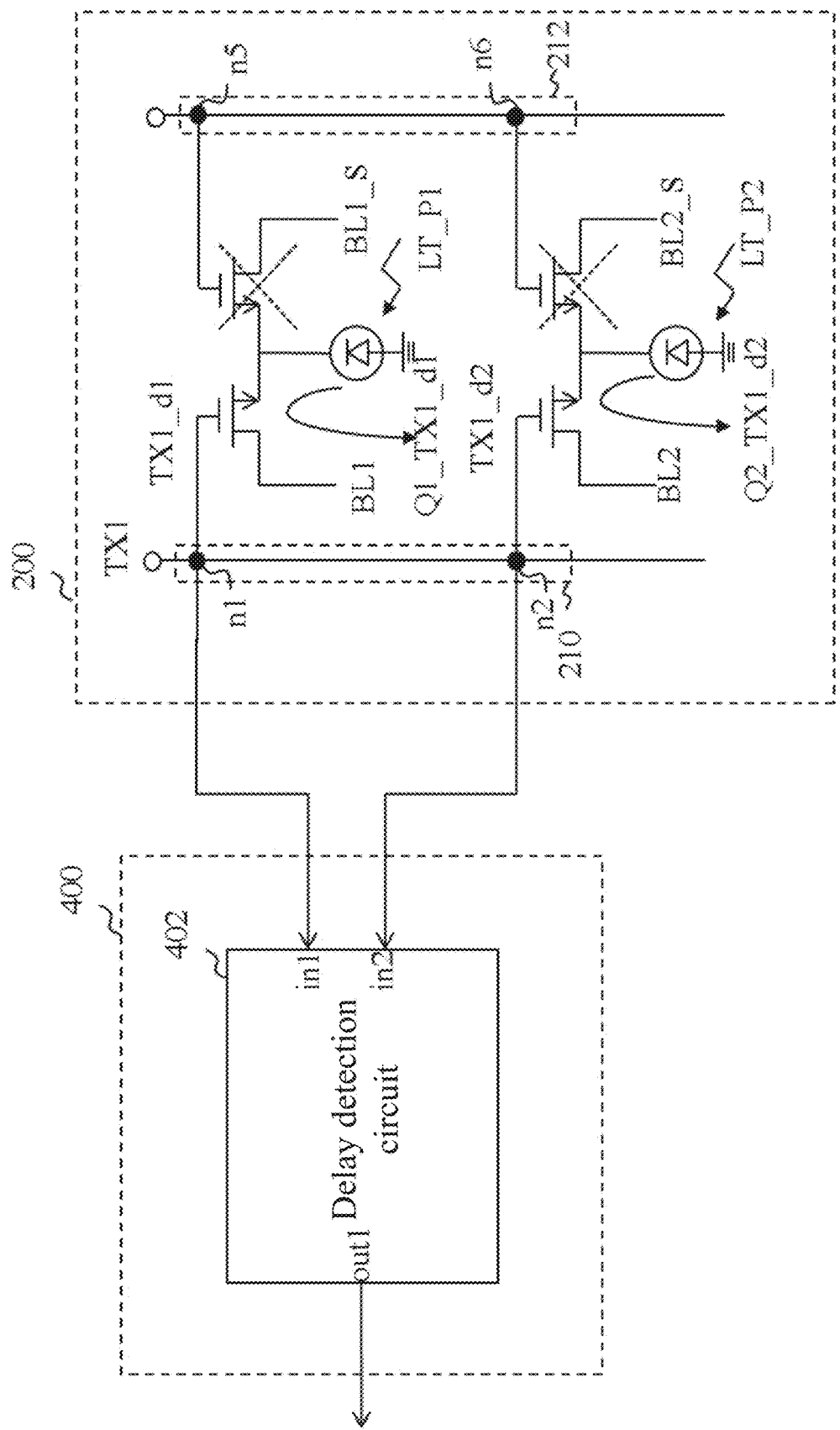
FIG. 3 is a schematic diagram illustrating a sensing operation of the photosensitive pixel array as shown in FIG. 2.

FIG. 3 is a schematic diagram illustrating a sensing operation of the photosensitive pixel array 200 as shown in FIG. 2. FIG. 4 is a schematic diagram illustrating another sensing operation of the with respect to FIG. 3. FIG. 5 is a schematic diagram showing the time sequence of signals related with the first photosensitive pixel PX1 and second photosensitive pixel PX2 shown in FIG. 3 to FIG. 4. FIG. 5 includes waveforms 600, 602, 604, 606, 608, 610, and 612.

Referring to FIG. 5, the waveform 600 represents the light LT_S that the light-emitting module 100 emits to the target object 20; the waveform 602 represents reflected light LT_P1 that is reflected to the first photosensitive pixel PX1 from the target object 20; the waveform 604 represents the delay pixel control signal TX1_d1 of the pixel control signal TX1 presented at the first node n1 due to the delay effect (the delay caused by the transmission line from the source of the pixel control signal TX1 to the first node n1); the waveform 606 represents the delay pixel control signal TX2_d1 of the pixel control signal TX2 presented at the fifth node n5 due to the delay effect (the delay caused by the transmission line from the source of the pixel control signal TX2 to the fifth node n5); the waveform 608 represents the reflected light LT_P2 reflected to the second photosensitive pixel PX2 from the target object 20, wherein the reflected light LT_P2 is illustrated to have an arrival time similar to the arrival time of the reflected light LT_P1; however, such illustration is made for the purpose of elucidating the negative effect caused by the time difference, and the present embodiment does not limited to the case where the tome that the reflected light LT_P1 reaches the first photosensitive pixel PX1 is the same as the time that the reflected light LT_P2 reaches the second photosensitive pixel PX2; the waveform 610 represents the delay pixel control signal TX1_d2 of the pixel control signal TX1 presented at the second node n2 due to the delay effect (the delay caused by the transmission line from the source of the pixel control signal TX1 to the second node n2); and the waveform 612 represents the delay pixel control signal TX2_d2 of the pixel control signal TX2 presented at the sixth node n6 due to the delay effect (the delay caused by the transmission line from the source of the pixel control signal TX2 to the sixth node n6).

Figure 4:
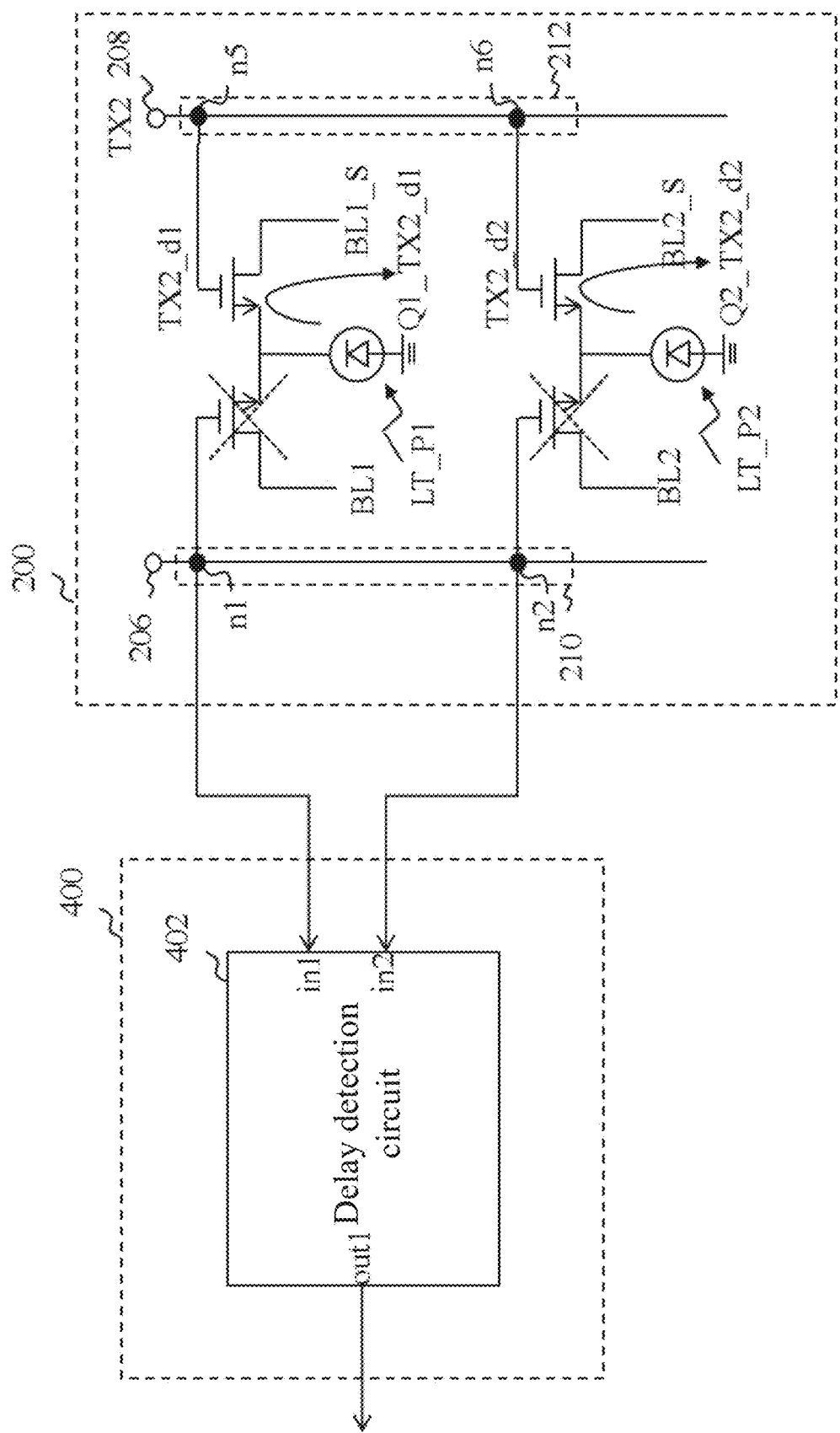
FIG. 4 is a schematic diagram illustrating another sensing operation of the with respect to FIG. 3.

For an image sensing event, reference is first made to FIG. 1, in conjunction with FIG. 3 to FIG. 5's waveform 600, the light-emitting module 100 emits the light LT_S to the target object 20 at the time point ts. Next, the pixel control signal generation circuit 300 sequentially and alternatingly changes the electric potential of the pixel control signals TX1 and TX2 and respectively transmits pixel control signals TX1 and TX2 through the pixel control signal transmission lines 210 and 212, thereby enabling transistors at the left-hand side and the right-hand side of the plurality of pixels, respectively.

<Regarding the Pixel Control Signal TX1 on the Pixel Control Signal Transmission Line 210>

<Regarding the First Photosensitive Pixel PX1>

As could be seen from the waveform 604 of FIG. 5, the pixel control signal TX1 reaches the first node n1 at the first time point t1 (referred to as the delay pixel control signal TX1_d1). Referring to FIG. 3 in conjunction with waveforms 602 and 604 of FIG. 5, the left-hand transistor M1 of the first photosensitive pixel PX1 is conducted in response to the delay pixel control signal TX1_d1 so that the first photosensitive pixel PX1 outputs the electric charges of the first photosensitive value Q1_TX1_d1 corresponding to the first location 22.

<Regarding the Second Photosensitive Pixel PX2>

As could be seen from the waveform 610 of FIG. 5, the pixel control signal TX1 reaches the second node n2 at the second time point t2 (referred to as the delay pixel control signal TX1_d2). Referring to FIG. 3 in conjunction with waveforms 608 and 610 of FIG. 5, the left-hand transistor M1 of the second photosensitive pixel PX is conducted in response to the delay pixel control signal TX1_d2 so that the second photosensitive pixel PX2 outputs the electric charges of the second photosensitive value Q2_TX1_d2 corresponding to the second location 24.

<Regarding the Pixel Control Signal TX2 on the Pixel Control Signal Transmission Line 212>

<Regarding the First Photosensitive Pixel PX1>

As could be seen from the waveform 602 and 606 of FIG. 5, the right-hand transistor M2 of the first photosensitive pixel PX1 is conducted in response to delay pixel control signal TX2_d1 so that the first photosensitive pixel PX1 outputs the electric charges of the photosensitive value Q1_TX2_d1 corresponding to the first location 22.

<Regarding the Second Photosensitive Pixel PX2>

As could be seen from the waveforms 608 and 612 of FIG. 5, the right-hand transistor M2 of the second photosensitive pixel PX2 is conducted in response to delay pixel control signal TX2_d2 so that the second photosensitive pixel PX2 outputs the electric charges of the photosensitive value Q2_TX2_d2 corresponding to the second location 22.

The processing unit 500 may estimate the time at which the incident light LT_P1 reaches the first photosensitive pixel PX1 based on the ratio between the first photosensitive value Q1_TX1_d1 and the photosensitive value Q1_TX2_d1 obtained using the incident light LT_P1, and then generate the first ToF based on the emission time of the light LT_S. The processing unit 500 may determine the first depth information of the first location 22 based on the first ToF. Similarly, the processing unit 500 may estimate the time at which the incident light LT_P2 reaches the second photosensitive pixel PX2 based on the ratio between the second photosensitive value Q2_TX1_d2 and the photosensitive value Q2_TX2_d2 obtained using the incident light LT_P2, and then generate the non-compensated second ToF (i.e., the second ToF wherein the time difference (t2−t1) is not canceled) based on the emission time of the light LT_S. Hence, the processing unit 500 may calibrate the non-compensated second ToF according to the time difference (t2−t1) provided by the delay detection circuit 402, and the processing unit 500 also generates the second depth information according to the calibrated second ToF.

Since the second ToF has been calibrated based on the time difference (t2−t1), the error resulted from the delay effect can be eliminated or mitigated, and hence, the second depth information thus-obtained is relatively accurate. In contrast, if the second ToF is not calibrated based on the time difference (t2−t1), the second depth information thus-obtained would include the error resulted from the time difference (t2−t1) and is thus relatively inaccurate.

Figure 6:
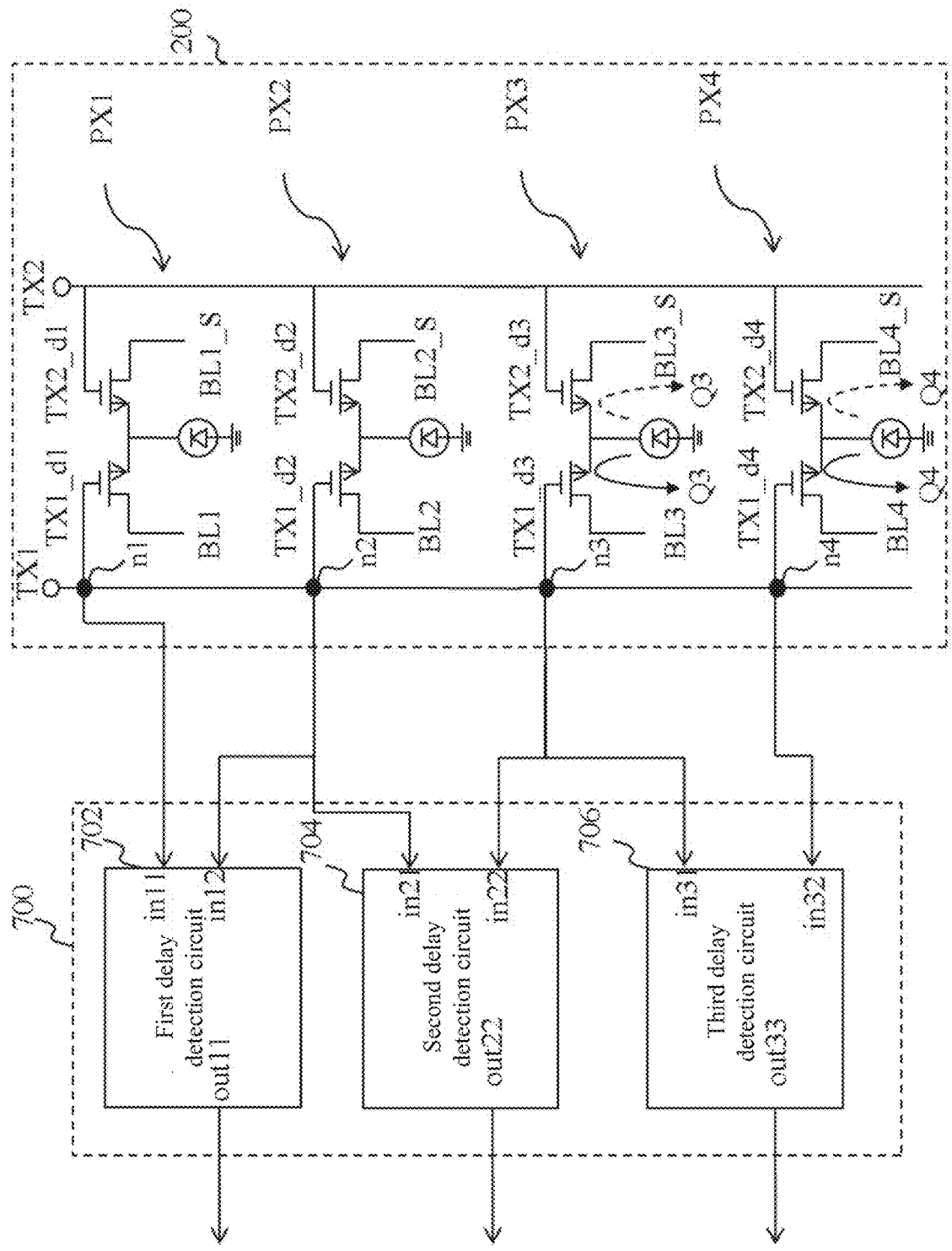
FIG. 6 is a circuit diagram of the circuit of the delay detection module according to another embodiment of the present disclosure.
Figure 7:
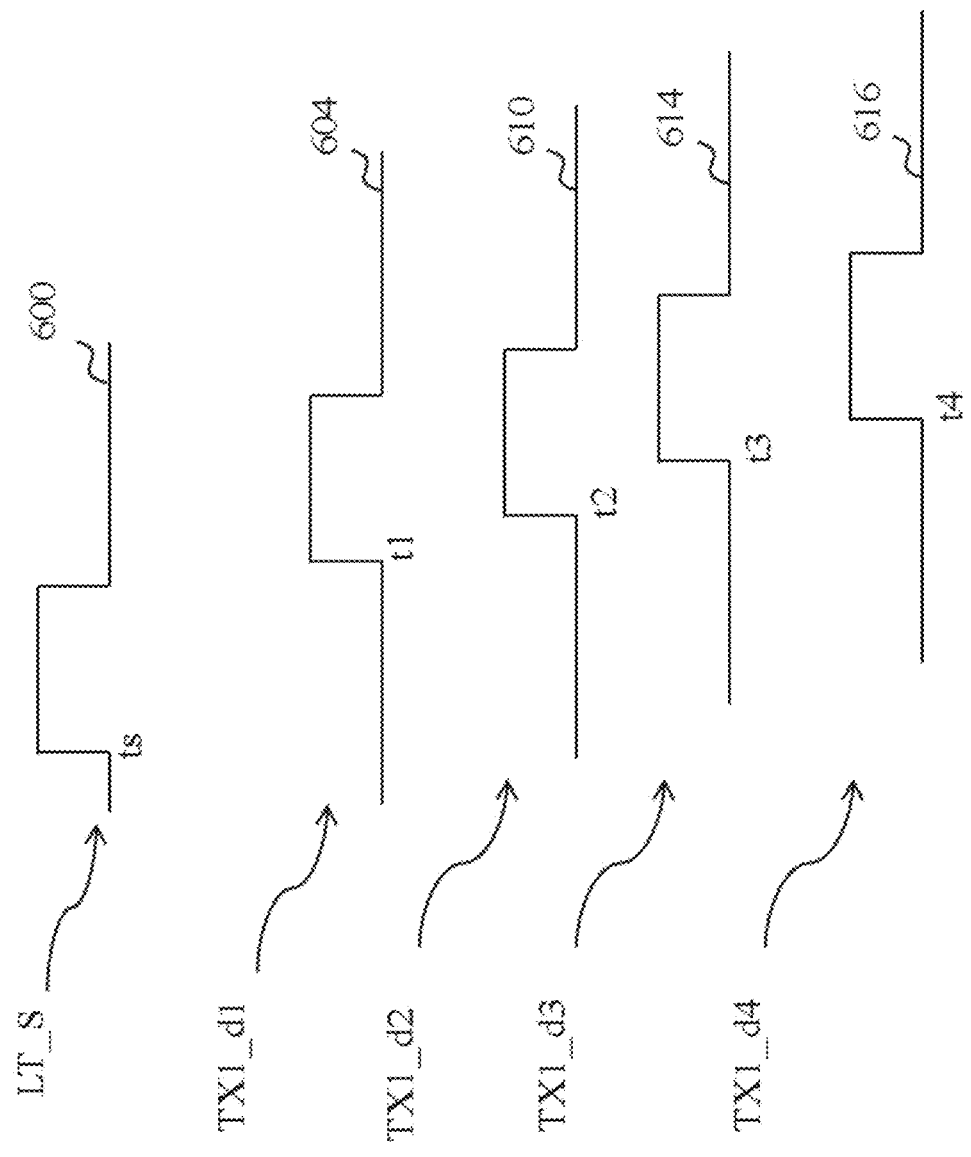
FIG. 7 is a schematic diagram showing the time sequence of signals related to the first photosensitive pixel, the second photosensitive pixel, the third photosensitive pixel, and the fourth photosensitive pixel illustrated in FIG. 6.

FIG. 6 is a circuit diagram of the circuit of the delay detection module 700 according to another embodiment of the present disclosure. In the embodiment of FIG. 6, a third photosensitive pixel PX3 and a fourth photosensitive pixel PX4 of the photosensitive pixel array 200 are further illustrated. FIG. 7 is a schematic diagram showing the time sequence of signals related to the first photosensitive pixel PX1, the second photosensitive pixel PX2, the third photosensitive pixel PX3, and the fourth photosensitive pixel PX4 illustrated in FIG. 6. In the embodiment of FIG. 6 and FIG. 7, the pixel control signal TX1 is taken as an example for the purpose of illustration. The operation that the delay detection module 700 performs with respect to the pixel control signal TX2 is similar to those employed by the delay detection module 400 in FIG. 2 to FIG. 5, and hence, a detailed description thereto is not repeated herein.

Referring to FIG. 7, the waveform 614 represents the delay pixel control signal TX1_d3 of the pixel control signal TX1 presented at the third node n3 due to the delay effect (the delay caused by the transmission line from the source of the pixel control signal TX1 to the third node n3); and the waveform 616 represents the delay pixel control signal TX1_d4 of the pixel control signal TX1 presented at the fourth node n4 due to the delay effect (the delay caused by the transmission line from the source of the pixel control signal TX1 to the fourth node n4).

Referring back to FIG. 6, the delay detection module 700 is similar to the delay detection module 400 of FIG. 3, except that the delay detection module 700 includes a first delay detection circuit 702, a second delay detection circuit 704, and a third delay detection circuit 706. The first delay detection circuit 702 has a first input terminal in11, a second input terminal in12 and an output terminal out1 1; the second delay detection circuit 704 has a first input terminal in21, a second input terminal in22, and an output terminal out22; and the third delay detection circuit 706 has a first input terminal in31, a second input terminal in32, and an output terminal out33. Moreover, in the embodiment of FIG. 6, a third photosensitive pixel PX3 and a fourth photosensitive pixel PX4 of the photosensitive pixel array 200, and a third node n3 and a fourth node n4 of the pixel control signal transmission line 210 are further illustrated.

The third node n3 is closer to the signal source that provides pixel control signal TX1 than the fourth node n4 does; that is, the pixel control signal TX1 starts the top of from FIG. 6 and moves downward by first passing through the third node n3 and then reaching the fourth node n4, wherein both the first node n1 and the second node n2 are closer to the signal source that provides pixel control signal TX1 than the third node n3 does. The third node n3 and the fourth node n4 are respectively coupled to the third photosensitive pixel PX3 and the fourth photosensitive pixel PX4, so as to transmit the pixel control signal TX1 to the third photosensitive pixel PX3 and the fourth photosensitive pixel PX4, so that the third photosensitive pixel PX3 and the fourth photosensitive pixel PX4 respectively output the third photosensitive value Q3 and the fourth photosensitive value Q4 corresponding to the third location 26 and the fourth location 28 according to the pixel control signal TX1. Specifically, the third photosensitive pixel PX3 outputs the stored electric charges to the processing unit 500 via the data lines BL3 and BL3_S, and the fourth photosensitive pixel PX4 outputs the stored electric charges to the processing unit 500 via the data lines BL4 and BL4_S.

Due to the parasitic resistance and/or parasitic capacitance of the pixel control signal transmission line 210, the time at which the pixel control signal TX1 reaches the third node n3 differs from the time at which the pixel control signal TX1 reaches the fourth node n4. For example, the pixel control signal reaches the third node n3 at the third time point t3 (as shown in FIG. 7) and reaches the fourth node n4 at the fourth time point t4, wherein the fourth time point t4 is later than the third time point t3. Accordingly, the activation time of the third photosensitive pixel PX3 is earlier than that of the fourth photosensitive pixel PX4.

It should be noted that in the present disclosure, the time at which the pixel control signal TX1 from the third node n3 reaches the third photosensitive pixel PX3 is the same as the time at which the pixel control signal TX1 from the fourth node n4 reaches the fourth photosensitive pixel PX4, wherein the time at which the pixel control signal TX1 from the third node n3 reaches the third photosensitive pixel PX3 is the same as the time at which the pixel control signal TX1 from the first node n1 reaches the first photosensitive pixel PX1 and the same as the time at which the pixel control signal TX1 from the second node n2 reaches the second photosensitive pixel PX2. In short, the transmission delays between each node and the corresponding photosensitive pixel are the same. The above-mentioned operation environment may be implemented using an appropriate circuit layout.

Additionally, the time at which the pixel control signal TX1 from the first node n1 reaches the first input terminal of the first delay detection circuit 702 is the same as the time at which the pixel control signal TX1 from the second node n2 reaches the second input terminal of the first delay detection circuit 702. Further, the time at which the pixel control signal TX1 from the second node n2 reaches the first input terminal of the second delay detection circuit 704 is the same as the time at which the pixel control signal TX1 from the third node n3 reaches the second input terminal of the second delay detection circuit 704. Also, the time at which the pixel control signal TX1 from the third node n3 reaches the first input terminal of the third delay detection circuit 706 is the same as the time at which the pixel control signal TX1 from the fourth node n4 reaches the second input terminal of the third delay detection circuit 706. In short, the transmission delays between each node and the corresponding delay detection circuit are the same, and hence, no relative error between the plurality of locations would take place when the 3D image sensor 10 generates depth information corresponding to a plurality of locations on the target object 20.

In some embodiments, take the first delay detection circuit 702 as an example, as long as the time at which the pixel control signal TX1 from the first node n reaches the first input terminal of the first delay detection circuit 702 is the same as the time at which the pixel control signal TX1 from the third node n3 reaches the second input terminal of first delay detection circuit 702, the first delay detection circuit 702 may also be configured to detect the first node n and the third node n3. In short, the present disclosure is not limited to the cases where the delay detection circuit can only detect two adjacent nodes.

The first input terminal in11 and the second input terminal in12 of the first delay detection circuit 702 are respectively coupled to the first node n1 and the second node n2, and are configured to determine the time difference (t2−t1) between the first time point t1 and the second time point t2; the detailed operation thereof is similar to the embodiment of FIG. 3 to FIG. 5. The output terminal out1 1 of the first delay detection circuit 702 is coupled to the processing unit 500 to provide the time difference (t2−t1) to the processing unit 500.

The first input terminal in21 and the second input terminal in22 of the second delay detection circuit 704 are respectively coupled to the second node n2 and the third node n3, and are configured to determine the time difference (t3−t2) between the second time point t2 and the third time point t3; the detailed operation thereof is similar to the embodiment of FIG. 3 to FIG. 5. The output terminal out22 of the second delay detection circuit 704 is coupled to the processing unit 500 to provide the time difference (t3−t2) to the processing unit 500.

The first input terminal in31 and the second input terminal in32 of the third delay detection circuit 706 are respectively coupled to the third node n3 and the fourth node n4, and are configured to determine the time difference (t4−t3) between the third time point t3 and the fourth time point t4; the detailed operation thereof is similar to the embodiment of FIG. 3 to FIG. 5. The output terminal out33 of the third delay detection circuit 706 is coupled to the processing unit 500 to provide the time difference (t4−t3) to the processing unit 500.

The processing unit 500 generates the first depth information based on the first photosensitive value. Specifically, the processing unit may estimate the time at which the incident light LT_P1 reaches the first photosensitive pixel PX1 based on the ratio of two photosensitive values (including the first photosensitive value) and then generate the first ToF based on the emission time of the light LT_S. The processing unit 500 may determine the first depth information of the first location 22 based on the first ToF.

Further, the processing unit 500 generates the second depth information based on the second photosensitive value and the time difference (t2−t1) between the first time point t1 and the second time point t2. Specifically, the processing unit 500 may estimate the time at which the incident light LT_P2 reaches the second photosensitive pixel PX2 based on the ratio between the two photosensitive values (including the second photosensitive value) obtained using the incident light LT_P2, and then generate a non-compensated second ToF based on the emission time of the light LT_S. Next, the delay detection circuit 402 provides the time difference (t2−t1) to the processing unit 500. The processing unit 500 calibrates the non-compensated second ToF according to the time difference (t2−t1). Thereafter, the processing unit 500 generates the second depth information according to the calibrated second ToF.

Similarly, the processing unit 500 generates the third depth information based on the third photosensitive value Q3, the time difference (t2−t1) between the first time point t1 and the second time point t2, and the time difference (t3−t2) between the second time point t2 and the third time point t3. Specifically, the processing unit 500 may estimate the time at which the incident light LT_P3 reaches the third photosensitive pixel PX3 based on ratio between the two photosensitive values (including the third photosensitive value Q3) obtained using the incident light LT_P3, and then generate a non-compensated third ToF based on the emission time of the light LT_S. Next, the delay detection circuit 402 provides the time differences (t2−t1) and (t3−t2) to the processing unit 500. The processing unit 500 calibrates the non-compensated third ToF according to the time differences (t2−t1) and (t3−t2). Thereafter, the processing unit 500 generates the third depth information according to the calibrated third ToF.

Similarly, the processing unit 500 generates the fourth depth information based on the fourth photosensitive value Q4, the time difference (t2−t1) between the first time point t1 and the second time point t2, the time difference (t3−t2) between the second time point t2 and the third time point t3, and the time difference (t4−t3) between the third time point t3 and the fourth time point t4. Specifically, the processing unit 500 may estimate the time at which the incident light LT_P4 reaches the fourth photosensitive pixel PX3 based on the ratio between two photosensitive values (including the fourth photosensitive value Q4) obtained using the incident light LT_P4, and then generate a non-compensated fourth ToF based on the emission time of the light LT_S. Next, the delay detection circuit 402 provides the time differences (t2-t), (t3−t2), and (t4−t3) to the processing unit 500. The processing unit 500 calibrates the non-compensated fourth ToF according to the time differences (t2−t1), (t3−t2) and (t4−t3). Thereafter, the processing unit 500 generates the fourth depth information according to the calibrated fourth ToF.

Since the second ToF has been calibrated based on the time difference (t2−t1), the third ToF has been calibrated based on the time differences (t2−t1) and (t3−t2), and the fourth ToF has been calibrated based on the time differences (t2−t1), (t3−t2) and (t4−t3), the error resulted from the delay effect can be eliminated or mitigated, and hence, the second depth information thus-obtained is relatively accurate.

Figure 8:
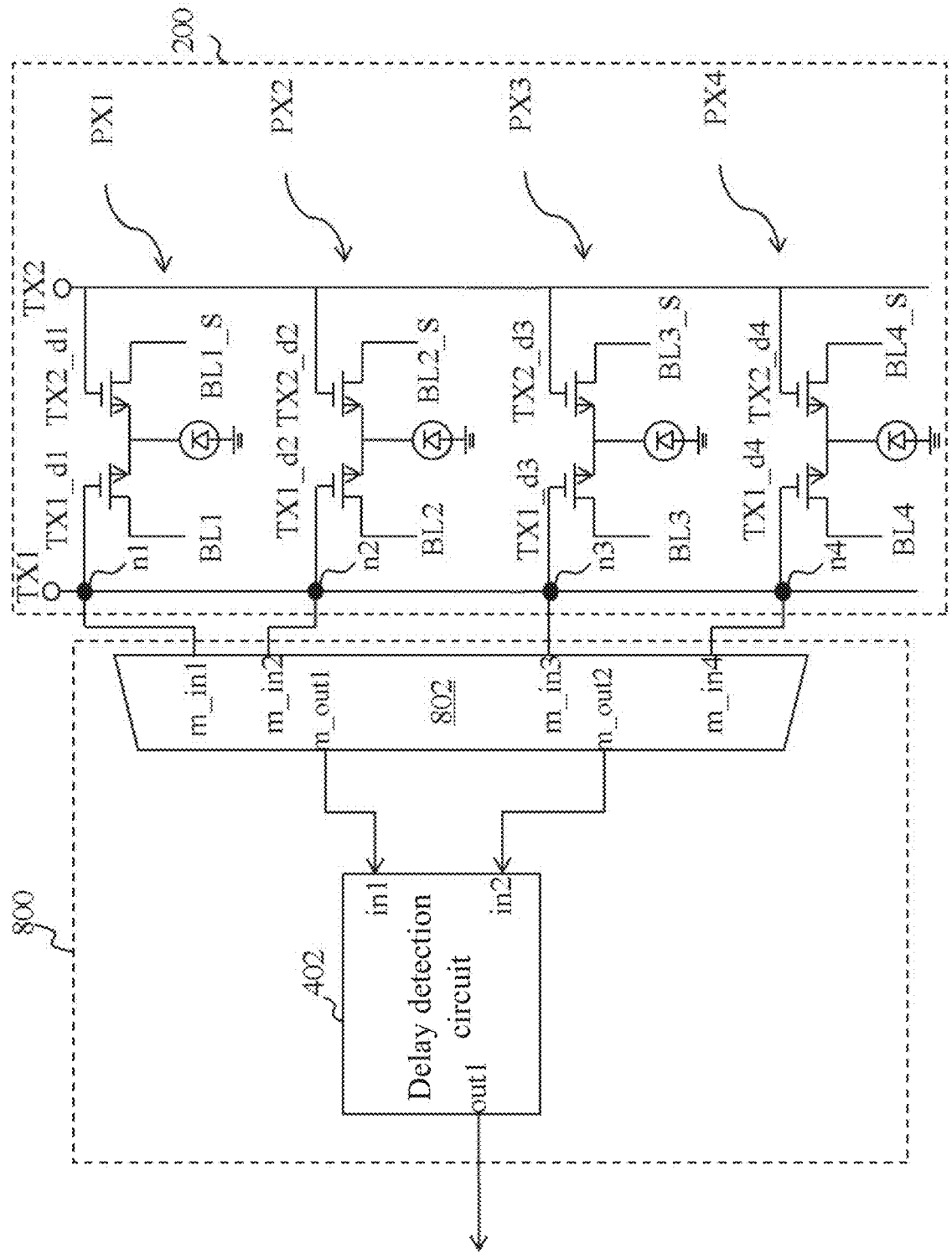
FIG. 8 is a circuit diagram of a delay detection module according to yet another embodiment of the present disclosure.

FIG. 8 is a circuit diagram of a delay detection module 800 according to yet another embodiment of the present disclosure. Referring to FIG. 8, the embodiment is similar to that disclosed in FIG. 6, and a third photosensitive pixel PX3 and a fourth photosensitive pixel PX4 of the photosensitive pixel array 200 and a third node n3 and a fourth node n4 of the pixel control signal transmission line 210 are further illustrated. The delay detection module 800 is similar to the delay detection module 400 shown in FIG. 2 with the exception that the delay detection module 800 further includes a multiplexer 802. The multiplexer 802 includes a first input terminal m_in1, a second input terminal m_in2, a third input terminal m_in3, and a fourth input terminal m_in4 respectively coupled to the first node n1, the second node n2, the third node n3, and the fourth node n4. The multiplexer 802 further has a first output terminal m_out1 and a second output terminal m_out2 respectively coupled to the first input terminal in1 and the second input terminal in2 of the delay detection circuit 402.

Additionally, the multiplexer 802 is configured to selectively outputs the signal received by at least two of the first input terminal m_in1, the second input terminal m_in2, the third input terminal m_in3, and the fourth input terminal m_in4 from the first output terminal m_out1 and the second output terminal m_out2 of the multiplexer 802.

It should be noted that the pixel control signal TX1 from the first node n1, the second node n2, the third node n3, and the fourth node n4, respectively reach the first input terminal m_in1, the second input terminal m_in2, the third input terminal m_in3, and the fourth input terminal m_in4 of the multiplexer 802 at the same time. The above-mentioned operation environment may be implemented using an appropriate circuit layout. For example, the length of the transmission line between the first node n1 and the first input terminal m_in1, the length of the transmission line between the second node n2 and the second input terminal m_in2, the length of the transmission line between the third node n3 and the third input terminal m_in3, and the length of the transmission line between the fourth node n4 and the fourth input terminal m_in4 may be designed to be equal.

Moreover, the first output terminal m_out1 and the second output terminal m_out2 of the pixel control signal TX1 from multiplexer 802 respectively reach the first input terminal in1 and the second input terminal in2 of the delay detection circuit 402 at the same time. The above-mentioned operation environment may be implemented using an appropriate circuit layout. For example, the length of the transmission line between the first output terminal m_out1 of the multiplexer 802 and the first input terminal in1 of the delay detection circuit 402 and the length of the transmission line between the second output terminal m_out2 of the multiplexer 802 and the second input terminal in2 of the delay detection circuit 402 may be designed to be equal.

Figure 9:
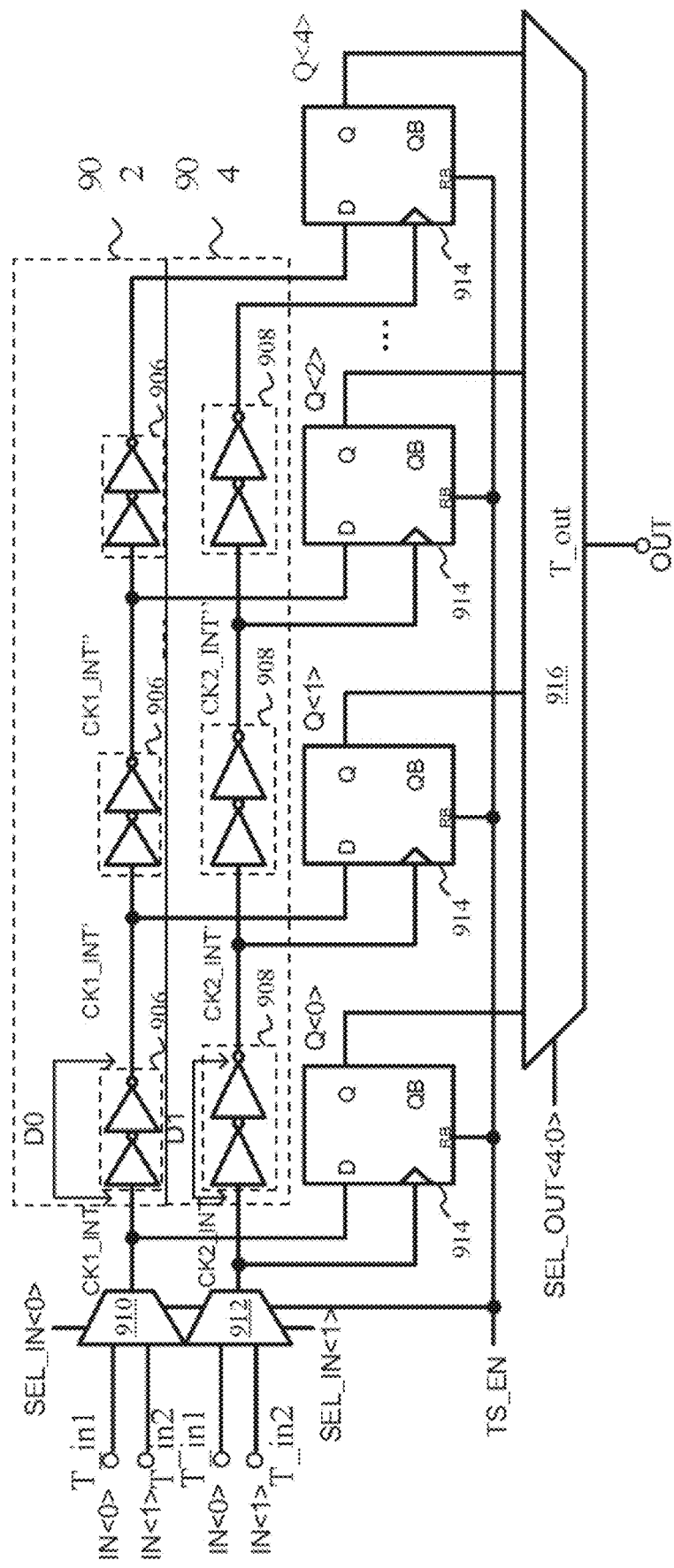
FIG. 9 is a schematic diagram showing a time-to-digit converter according to one embodiment of the present disclosure.

FIG. 9 is a schematic diagram showing a time-to-digit converter 900 according to one embodiment of the present disclosure. All of the delay detection circuit 402 of the embodiment illustrated in FIG. 2, and the first delay detection circuit 702, the second delay detection circuit 704 and the third delay detection circuit 706 of the embodiment illustrated in FIG. 6 may be implemented using the time-to-digit converter 900. Referring to FIG. 9, in which the time-to-digit converter 900 includes a first input terminal T_in1, a second input terminal T_in2, and an output terminal T_out. The first input terminal T_in1 and the second input terminal T_in2 of the time-to-digit converter 900 respectively receives the input signals IN<0> and IN<1>, and the output terminal T_out of the time-to-digit converter 900 outputs an output signal OUT. For example, the first input terminal T_in1 and the second input terminal T_in2 of the time-to-digit converter 900 are respectively coupled to the first input terminal in1 and the second input terminal in2 of the delay detection circuit 402, and the output terminal T_out of the of the time-to-digit converter 900 is coupled to the processing unit 500.

The time-to-digit converter 900 includes a first delay chain 902, a second delay chain 904, two multiplexers 910 and 912, a plurality of flip-flops 914, and a multiplexer 916. The present embodiment includes four flip-flops 914; however, the present disclosure is not limited thereto.

The multiplexer 910 is coupled to the first input terminal T_in1 and the second input terminal T_in2 of the time-to-digit converter 900 to receive the input signals IN<0> and IN<1>, and output one of the input signals IN<0> and IN<1> according to a selection signal SEL_IN<0>. Similarly, the multiplexer 912 is coupled to the first input terminal T_in1 and the second input terminal T_in2 of the time-to-digit converter 900 to receive the input signals IN<0> and IN<1>, and output one of the input signals IN<0> and IN<1> according to a selection signal SEL_IN<1>, wherein the selection signal SEL_IN<1> is opposite to the selection signal SEL_IN<0>.

The input terminal D of each flip-flop 914 is coupled to the first delay chain 902, and a clock terminal is coupled to the second delay chain 904. The output terminal Q of the first-stage flip-flop 914 provides the output signal Q<0> to the multiplexer 916; the output terminal Q of the second-stage flip-flop 914 provides the output signal Q<1> to the multiplexer 916; and similarly, the output terminal Q of the fourth-stage flip-flop 914 provides the output signal Q<4> to the multiplexer 916. In some embodiments, the flip-flop 914 is a D-type flip-flop.

The multiplexer 916 is configured to selectively output one of the output signals Q<0> to Q<4> according to the selection signal SEL_OUT<4:0>. In some embodiments, the multiplexer 916 is optional. In the present embodiment, the output terminal Q of each flip-flop 914 is coupled to the processing unit 500.

The first delay chain 902 includes a plurality of first buffers 906, and the second delay chain 904 includes a plurality of second buffers 908. The delay time point D0 of the first buffer 906 differs from the delay time point D1 of the second buffer 908. In the present embodiment, the delay time point D1 is greater than the delay time point D0.

Figure 10:
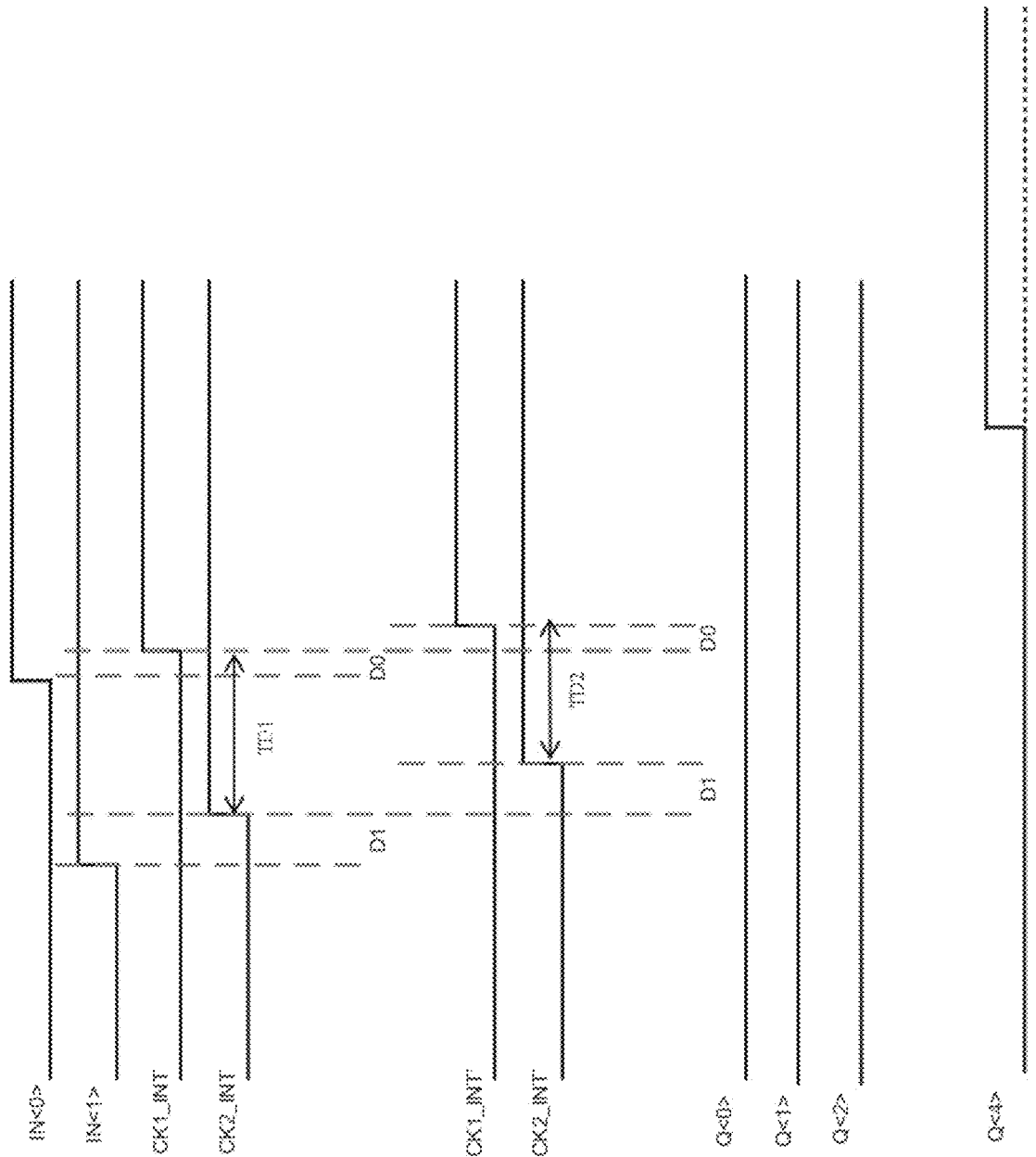
FIG. 10 is a schematic diagram showing the time sequence of signals related to the time-to-digit converter illustrated in FIG. 9.

FIG. 10 is a schematic diagram showing the time sequence of signals related to the time-to-digit converter 900 illustrated in FIG. 9. Referring to FIG. 9 and FIG. 10; the multiplexer 910 outputs the signal CK1_INT to the first delay chain 902, and the multiplexer 912 outputs the signal CK2_INT to the second delay chain 904. The input terminal D of the zero-stage flip-flop 914 receives the signal CK1_INT, and the clock terminal receives the signal CK2_INT. According to the operation principle of the flip-flop, since the signal CK1_INT falls behind CK2_INT (the two have a phase difference TD1 therebetween), the logic of the output signal Q<0> outputted by the zero-stage flip-flop 914 is 0.

Next, the signal CK1_INT on the first delay chain 902 is delayed by the first buffer 906 and becomes the signal CK1_INT', whereas the signal CK2_INT on the second delay chain 904 is delayed by the second buffer 908 and becomes the signal CK2_INT'. The input terminal D of the first-stage flip-flop 914 receives the signal CK1_INT', and the clock terminal receives the signal CK2_INT'. According to the operation principle of the flip-flop, since the signal CK1_INT' falls behind the signal CK2_INT' (the two have a phase difference TD2 therebetween), the logic of the output signal Q<1> outputted by the first-stage flip-flop 914 is 0. However, since the delay time point D1 is greater than the delay time point D0, the phase difference TD2 is smaller than the phase difference TD1. Such operation is continued until the signal CK1_INT' no longer falls behind the signal CK2_INT', and the two are respectively inputted into the input terminal D of the fourth-stage flip-flop 914 and the clock terminal. The logic of the output signal Q<4> outputted by the fourth-stage flip-flop 914 is 1.

Based on the information that logic value of the output signal Q<4> being 1, the processing unit 500 may determine that the phase difference between the input signals IN<0> and IN<1> falls within the range from three times the difference value between the delay time point D0 and the delay time point D1 to four times the difference value between the delay time point D0 and the delay time point D1. Take the time difference (t2−t1) for example, the range of the time difference (t2−t1) falls within the range from 3*(D1−D0) to 4*(D1−D0).

Figure 11:
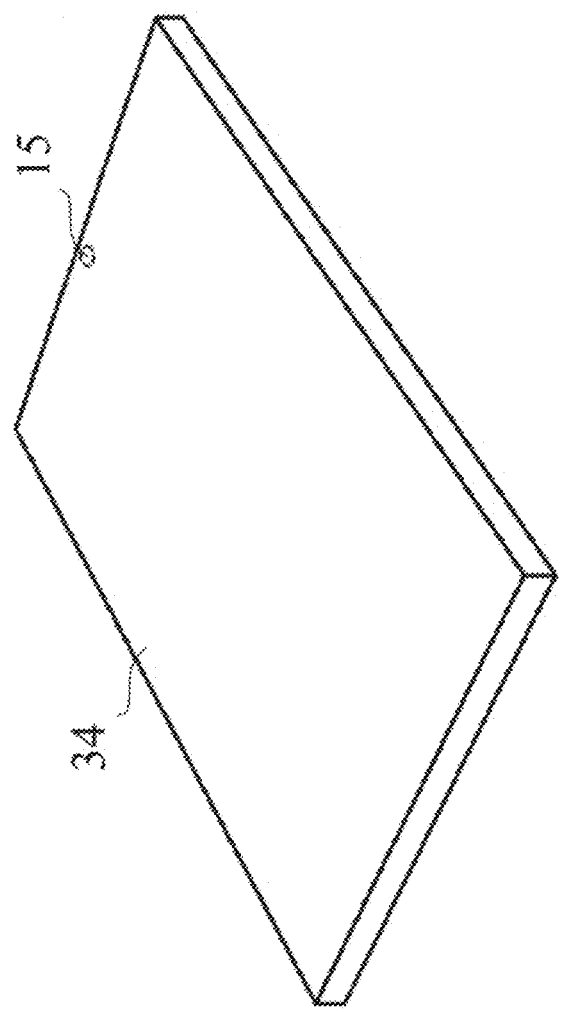
FIG. 11 is a schematic diagram illustrating the application of a 3D image sensing module in a hand-held device according to one embodiment.

FIG. 11 is a schematic diagram illustrating the application of a 3D image sensing module 15 in a hand-held device 20 according to one embodiment. Referring to FIG. 11, the hand-held device 30 includes a display screen assembly 34 and the 3D image sensing module 15. The hand-held device 30 may be configured to carry out the ToF sensing and/or 3D image sensing for facial recognition. For example, the hand-held device 30 may be any electronic device, such as a smartphone, personal digital assistant, hand-held computer system or a tablet computer.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A three-dimensional (3D) image sensor, configured to generate a first depth information and a second depth information for a first location and a second location of a target object, respectively, by receiving light reflected from the target object, wherein the 3D image sensor comprises:
   a photosensitive pixel array, comprises:
      a first photosensitive pixel;
      a second photosensitive pixel; and
      a pixel control signal transmission line, having a first node and a second node respectively coupled to the first photosensitive pixel and the second photosensitive pixel to transmit the pixel control signal to the first photosensitive pixel and the second photosensitive pixel, so that the first photosensitive pixel and the second photosensitive pixel respectively output a first photosensitive value and a second photosensitive value corresponding to the first location and the second location according to the pixel control signal;
      wherein time taken for the pixel control signal to reach the first photosensitive pixel from the first node is the same as time taken for the pixel control signal to reach the second photosensitive pixel from the second node, and the pixel control signal reaches the first node at a first time point and reaches the second node at a second time point, wherein the second time point is later than the first time point;
   a delay detection module, wherein the delay detection module comprises:
      a first delay detection circuit, having a first input terminal and a second input terminal respectively coupled to the first node and the second node and configured to determine a time difference between the first time point and the second time point; and
   a processing unit, configured to generate the first depth information and the second depth information based on the first photosensitive value, the second photosensitive value, and the time difference.

2. The 3D image sensor of claim 1, wherein the target object reflects the light to the first photosensitive pixel and the second photosensitive pixel.

3. The 3D image sensor of claim 1, wherein time taken for the pixel control signal to reach the first input terminal of the first delay detection circuit from the first node is the same as, the time taken for the pixel control signal to reach the second input terminal of the first delay detection circuit from the second node.

4. The 3D image sensor of claim 3, wherein the photosensitive pixel array further comprises:
   a third photosensitive pixel and a fourth photosensitive pixel, respectively configured to generate a third depth information and a fourth depth information for a third location and a fourth location of the target object, respectively;
   wherein the pixel control signal transmission line further comprises: a third node and a fourth node respectively coupled to the third photosensitive pixel and the fourth photosensitive pixel to transmit the pixel control signal to the third photosensitive pixel and the fourth photosensitive pixel, so that the third photosensitive pixel and the fourth photosensitive pixel respectively output a third photosensitive value and a fourth photosensitive value corresponding to the third location and the fourth location according to the pixel control signal;
   wherein time taken for the pixel control signal to reach the third photosensitive pixel from the third node is the same as time taken for the pixel control signal to reach the fourth photosensitive pixel from the fourth node, and the pixel control signal reaches the third node at a third time point and reaches the fourth node at a fourth time point, wherein the fourth time point is later than the third time point, and the third time point is later than the second time point.

5. The 3D image sensor of claim 4, wherein the delay detection module further comprises:
   a second delay detection circuit, having a first input terminal and a second input terminal respectively coupled to the second node and the third node, and configured to determine a time difference between the second time point and the third time point; and
   a third delay detection circuit, having a first input terminal and a second input terminal respectively coupled to the third node and the fourth node, and configured to determine a time difference between the third time point and the fourth time point;
   wherein the processing unit further generate a third depth information and a fourth depth information based on the third photosensitive value, the fourth photosensitive value, the time difference between the first time point and the second time point, the time difference between the second time point and the third time point, and the time difference between the third time point and the fourth time point.

6. The 3D image sensor of claim 5, wherein time taken for the pixel control signal to reach the first input terminal of the second delay detection circuit from the second node is the same as time taken for the pixel control signal to reach the second input terminal of the second delay detection circuit from the third node, and a time point at which the pixel control signal reaches the first input terminal of the third delay detection circuit from the third node is the same as a time point at which the pixel control signal reaches the second input terminal of the third delay detection circuit from the fourth node.

7. The 3D image sensor of claim 4, wherein the delay detection module further comprises:
a multiplexer, having a first input terminal, a second input terminal, a third input terminal, and a fourth input terminal respectively coupled to the first node, the second node, the third node, and the fourth node, wherein the multiplexer further has a first output terminal and a second output terminal respectively coupled to the first input terminal and the second input terminal of the first delay detection circuit, wherein the multiplexer is configured to selectively outputs two of the signals received by the first input terminal, the second input terminal, the third input terminal, and the fourth input terminal from the first output terminal and the second output terminal of the multiplexer.

8. The 3D image sensor of claim 7, wherein time points at which the pixel control signal reaches the first input terminal, the second input terminal, the third input terminal, and the fourth input terminal of the multiplexer from the first node, the second node, the third node and the fourth node, respectively are the same.

9. The 3D image sensor of claim 7, wherein the time points at which the pixel control signal reaches the first input terminal and the second input terminal of the first delay detection circuit from the first output terminal and the second output terminal of the multiplexer, respectively are the same.

10. The 3D image sensor of claim 2, wherein the processing unit further generates a first time-of-flight (ToF) and a non-compensated second ToF based on a time point at which the light-emitting module emits the light, the first photosensitive value, and the second photosensitive value.

11. The 3D image sensor of claim 10, wherein the processing unit further calibrates the non-compensated second ToF according to the time difference, and generates the first depth information and the second depth information according to the first ToF and the calibrated second ToF.

12. The 3D image sensor of claim 10, wherein the first delay detection circuit comprises a time-to-digit converter, configured to convert the time difference between the first time point and the second time point into a digital signal.

13. The 3D image sensor of claim 12, wherein the time-to-digit converter comprises a first delay chain and a second delay chain, wherein the first delay chain comprises a plurality of first buffers, and the second delay chain comprises a plurality of second buffers, wherein a delay time of the first buffer is different from a delay time of the second buffer.

14. The 3D image sensor of claim 1, wherein each of the first photosensitive pixel and the second photosensitive pixel comprises:
a light sensor, configured to convert incident light into electric charges and store the same; and
a switch, configured to selectively output the electric charges stored by the light sensor according to the pixel control signal;
wherein the first photosensitive pixel outputs the electric charges corresponding to the first photosensitive value, and the second photosensitive pixel outputs the electric charges corresponding to the second photosensitive value.

15. A 3D image sensing module, comprising:
a light-emitting module, configured to emit a light signal to a target object; and
a 3D image sensor, configured to generate a first depth information and a second depth information for a first location and a second location of the target object, respectively, by receiving light reflected from the target object, wherein the 3D image sensor comprises:
a photosensitive pixel array, comprises:
a first photosensitive pixel;
a second photosensitive pixel; and
a pixel control signal transmission line, having a first node and a second node respectively coupled to the first photosensitive pixel and the second photosensitive pixel to transmit the pixel control signal to the first photosensitive pixel and the second photosensitive pixel, so that the first photosensitive pixel and the second photosensitive pixel respectively output a first photosensitive value and a second photosensitive value corresponding to the first location and the second location according to the pixel control signal;
wherein time taken for the pixel control signal to reach the first photosensitive pixel from the first node is the same as time taken for the pixel control signal to reach the second photosensitive pixel from the second node, and the pixel control signal reaches the first node at a first time point and reaches the second node at a second time point, wherein the second time point is later than the first time point;
a delay detection module, wherein the delay detection module comprises:
a first delay detection circuit, having a first input terminal and a second input terminal respectively coupled to the first node and the second node and configured to determine a time difference between the first time point and the second time point; and
a processing unit, configured to generate the first depth information and the second depth information based on the first photosensitive value, the second photosensitive value, and the time difference.

16. The 3D image sensing module of claim 15, wherein the light-emitting module comprises a laser diode or a light-emitting diode.

17. A hand-held device, comprising:
a display panel; and
a 3D image sensing module, comprising:
a light-emitting module, configured to emit a light signal to a target object;
a 3D image sensor comprising a photosensitive pixel array, wherein the photosensitive pixel array comprises:
a pixel control signal transmission line, having a first node and a second node;
a first photosensitive pixel, coupled to the first node of the pixel control signal transmission line to receive a pixel control signal and configured to output a first photosensitive value corresponding to a first location, and the pixel control signal reaches the first node at a first time point; and
a second photosensitive pixel, coupled to the second node of the pixel control signal transmission line to receive the pixel control signal and configured to output a second photosensitive value corresponding to a second location, wherein the pixel control signal reaches the second node at a second time point, and the second time point is later than the first time point, time taken for the pixel control signal to reach the first photosensitive pixel from the first node is the same as time taken for the pixel control signal to reach the second photosensitive pixel from the second node;
a first delay detection circuit, having a first input terminal and a second input terminal respectively coupled to the first node and the second node and configured to determine a time difference between the first time point and the second time point; and
a processing unit, configured to generate a first depth information and a second depth information based on the first photosensitive value, the second photosensitive value, and the time difference.

18. The hand-held device of claim 17, wherein the target object reflects the light to the first photosensitive pixel and the second photosensitive pixel.

19. The hand-held device of claim 17, wherein time taken for the pixel control signal to reach the first input terminal of the first delay detection circuit from the first node is the same as, the time taken for the pixel control signal to reach the second input terminal of the first delay detection circuit from the second node.

20. The hand-held device of claim 17, wherein the photosensitive pixel array further comprises:
a third photosensitive pixel and a fourth photosensitive pixel, respectively configured to generate a third depth information and a fourth depth information for a third location and a fourth location of the target object, respectively;
wherein the pixel control signal transmission line further comprises: a third node and a fourth node respectively coupled to the third photosensitive pixel and the fourth photosensitive pixel to transmit the pixel control signal to the third photosensitive pixel and the fourth photosensitive pixel, so that the third photosensitive pixel and the fourth photosensitive pixel respectively output a third photosensitive value and a fourth photosensitive value corresponding to the third location and the fourth location according to the pixel control signal;
wherein time taken for the pixel control signal to reach the third photosensitive pixel from the third node is the same as time taken for the pixel control signal to reach the fourth photosensitive pixel from the fourth node, and the pixel control signal reaches the third node at a third time point and reaches the fourth node at a fourth time point, wherein the fourth time point is later than the third time point, and the third time point is later than the second time point.

* * * * *